CONVERSION FROM GRAY CODE TO BINARY CODE

Filed Oct. 15, 1964

INVENTOR.
MAO C. WANG
BY
Carl V. Olson
Attorney

United States Patent Office 3,373,421

Patented Mar. 12, 1968

3,373,421
CONVERSION FROM GRAY CODE TO BINARY CODE

Mao C. Wang, Camden, N.J., assignor to Radio Corporation of America, a corporation of Delaware Filed Oct. 15, 1964, Ser. No. 404,117
4 Claims. (Cl. 340—347)

ABSTRACT OF THE DISCLOSURE

A Gray-to-binary code converter includes N bit input terminals connected through respective signal paths to an equal number of output terminals. The signal paths include tiers of exclusive "or" gates, the number of tiers being equal to $\log_2 N$ where N is a number of bits equal to an integral power of two. Each tier includes a number equal to $N-N/2^t$ of exclusive "or" gates having inputs coupled to respective low-order signal paths, where $t$ is the number of the particular tier. Each gate also has an input coupled to a respective signal path $N/2^t$ bits positions removed in the higher order direction.

*General*

Figure 1:
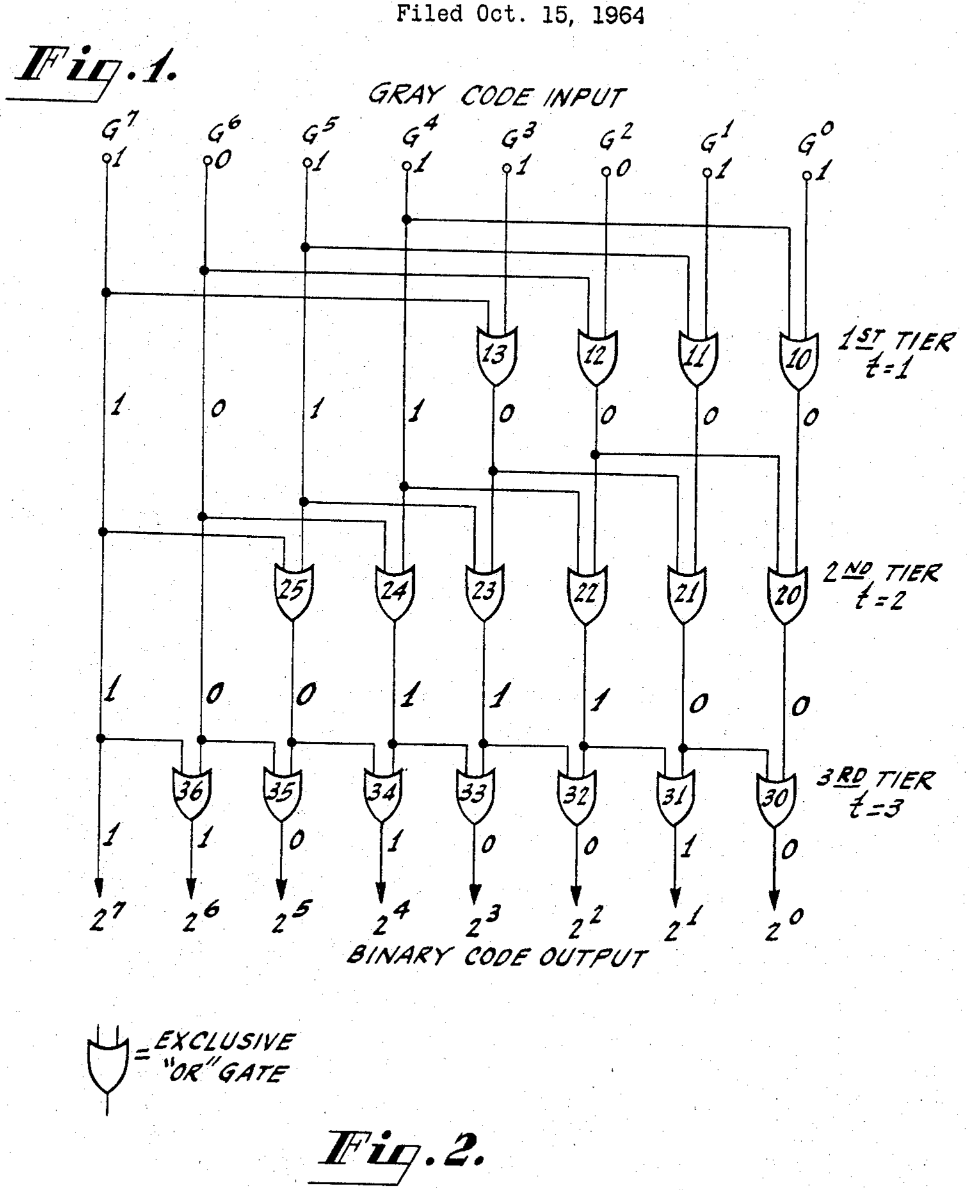

This invention relates to converters for converting any number represented in the Gray or reflected code to the corresponding number represented in the conventional binary code.

Equivalent quantities in the decimal, Gray and binary codes are given in the following table:

| Decimal | Gray | Binary |
|---|---|---|
| 0 | 00000 | 00000 |
| 1 | 00001 | 00001 |
| 2 | 00011 | 00010 |
| 3 | 00010 | 00011 |
| 4 | 00110 | 00100 |
| 5 | 00111 | 00101 |
| 6 | 00101 | 00110 |
| 7 | 00100 | 00111 |
| 8 | 01100 | 01000 |
| 9 | 01101 | 01001 |
| 10 | 01111 | 01010 |
| 11 | 01110 | 01011 |
| 12 | 01010 | 01100 |
| 13 | 01011 | 01101 |
| 14 | 01001 | 01110 |
| 15 | 01000 | 01111 |
| 16 | 11000 | 10000 |

The Gray or reflected code is a code in which each word, made up of many digits, differs in one digit only from adjacent words in the counting sequence. This characteristic of the Gray or reflected code makes it especially useful and reliable in connection with certain apparatus and processes in which continuously varying quantities are encoded. For example, an analog-to-digital converter is an important unit used to translate a continuously varying signal into a binary-coded signal. When the varying quantity is encoded in the Gray code, a failure to make a one-digit change results in a Gray coded word that is in error by only one unit in the counting sequence. The maximum sampling error in the Gray code is one counting unit. By contrast, a failure to make any one of several digit changes in a binary coded word may result in an error of many units in the counting sequence. A sampling error in the binary code may represent an error of many counting units. However, the Gray code is unsuited for use in a computer in the performance of the usual arithmetic manipulations. Therefore, a converter is needed to translate numbers in the Gray or reflected code to the corresponding numbers in the conventional binary code.

It is a general object of this invention to provide an improved converter for converting any number in the Gray or reflected code to a corresponding number in the conventional binary code, the converter being characterized in being simple, economical to manufacture, and rapid in operation.

According to an example of the invention, a Gray-to-binary converter includes N bit input terminals connected through respective signal paths to an equal number of output terminals. The signal paths include tiers of exclusive "or" gates, the number of tiers being equal to $\log_2 N$ where N is a number of bits equal to an integral power of two. Each tier includes a number equal to $N-N/2^t$ of exclusive "or" gates having inputs coupled to respective low-order signal paths, where $t$ is the number of the particular tier. Each gate also has an input coupled to a respective signal path $N/2^t$ bit positions removed in the higher order direction. The conversion of a Gray code number having N bits to the corresponding binary code number is accomplished in the time of $\log_2 N$ transistor circuit stage delays.

Figure 2:
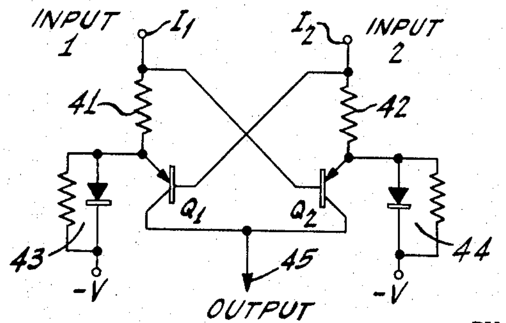

In the drawing:

FIG. 1 is a schematic diagram of a code converter constructed according to the teachings of the invention; and FIG. 2 is a circuit diagram of an exclusive "or" gate for use in the converter of FIG. 1.

Referring now in greater detail to the drawing, there is shown a code converter including Gray code signal bit input terminals $G^0$ through $G^7$ for eight bits of an input word. The input terminals are connected through respective signal paths to respective binary code signal bit output terminals $2^0$ through $2^7$. There are three tiers of exclusive "or" gates arranged in the signal paths. The number of necessary tiers of gates is determined by the number of bits in the words to be converted. In the present example, the number of bits N is equal to eight, and the number of tiers is equal to $\log_2 N$, or $\log_2 8$, which is equal to 3.

The first tier of gates includes four gates 10, 11, 12 and 13 located in the signal paths of the four lowest-order bits. Each of the gates in the first tier has also an input connected to a signal path for a higher-order bit four bit positions removed to the left. The second tier of gates includes six gates 20 through 25 located in the six signal paths for the six lowest-order bits. Each gate in the second tier also has an input coupled to a respective signal path for a higher-order bit two bit positions removed to the left. The third tier of gates includes seven gates 30 through 36 located in the seven lowest-order signal paths. Each gate in the third tier also includes an input connected to the next-higher-order signal path.

The number of gates in any tier is given by $N-N/2^t$, where N is the number of bits and $t$ is the number of the tier counting from the input end. One input of each gate is coupled to the respective low-order signal path. The other input of each gate is coupled to a respective signal path removed or offset in the higher order direction by $N/2^t$ bit positions. The values in the present example where $N=8$ are as follows:

| | No. of Gates, $N-N/2^t$ | Bits Offset, $N/2^t$ |
|---|---|---|
| tier 1 | $8-8/2^1=4$ | $8/2^1=4$ |
| tier 2 | $8-8/2^2=6$ | $8/2^2=2$ |
| tier 3 | $8-8/2^3=7$ | $8/2^3=1$ |

The formulas may be used to design a converter for Gray coded numbers having any desired number N of bits. It is first necessary to determine the number of tiers equal to $\log_2 N$. Examples are as follows:

| No. of bits, N: | No. of tiers, $\log_2 N$ |
|---|---|
| 1 | 0 |
| 2 | 1 |
| 4 | 2 |
| 8 | 3 |
| 16 | 4 |
| 32 | 5 |
| 64 | 6 |

If the desired number of bits falls between numbers which are integral powers of 2, the higher number N is used in determining the number of tiers, and the number of gates in each tier. However, unused high order signal paths, and gates coupled thereto, may be omitted from the converter actually constructed.

FIG. 2 illustrates an exclusive "or" gate useful in the converter of FIG. 1 at the places of each of the "or" gate symbols in the diagram. The exclusive "or" gate of FIG. 2 includes input terminals $I_1$ and $I_2$ each connected to a respective base electrode of transistors $Q_2$ and $Q_1$. The input terminals $I_1$ and $I_2$ are also connected through resistors 41 and 42 to emitter electrodes of respective transistors $Q_1$ and $Q_2$. The emitter of each transistor is connected through a respective parallel circuit 43, 44, each including a diode and a resistor, to the negative terminal −V of a source of unidirectional bias potential (not shown). The collectors of transistors $Q_1$ and $Q_2$ are connected together to an output terminal 45.

In operation, the exclusive "or" gate in FIG. 2 provides an output signal on its output terminal 45 solely when there is an input signal applied to one or the other, but not both, of the input terminals $I_1$ and $I_2$. In the absence of inputs to terminals $I_1$ and $I_2$, the transistors $Q_1$ and $Q_2$ are nonconducting and no output signal appears at output terminal 45. When a positive signal is applied solely to input terminal $I_1$, the transistor $Q_1$ is rendered conductive by the positive going signal on its emitter electrode, and the transistor $Q_2$ is kept cut off by the positive signal on its base electrode. The conduction in transistor $Q_1$ causes an output to appear on the common output terminal 45. The same output signal appears when a positive going input signal is applied solely to input terminal $I_2$. If positive going signals are applied to both of the input terminals $I_1$ and $I_2$, both transistors remain cut off because the base electrodes of both transistors receive potentials more positive than the potentials applied to their emitter electrodes.

The operation of the converter of FIG. 1 will now be described by giving an example in which a particular Gray coded number is converted to the corresponding binary coded number. In the numeric example, the Gray-coded number applied to the input terminals $G^7$ through $G^0$ is 10111011, where the most significant digit is at the left and the least significant digit is at the right. Each of the exclusive "or" gates 10, 11, 12 and 13 in the first tier performs the exclusive "or" function on the two bit signals applied to its inputs to produce the first resulting number 10110000. The outputs of gates 10, 11 and 13 are 0's because both of their inputs are 1's. The output of gate 12 is 0 because both of its inputs are 0's.

The gates 20 through 25 in the second tier of gates each responds to its two inputs to produce a second resulting number 10011100. Gates 20, 21 and 25 produce 0 outputs because their inputs are the same. Gates 22, 23 and 24 produce 1 outputs because their two inputs are different.

Finally, the gates 30 through 36 of the third tier produce on output terminals $2^7$ through $2^0$ the number 11010010, which is the binary-coded equivalent of the number in the Gray code applied to the input terminals $G^7$ through $G^0$.

The conversion of an eight-bit Gray-coded number to the corresponding binary coded number is accomplished in the time of only three transistor circuit stage delays because there are only three tiers of exclusive "or" gate transistor circuits. If, for example, the converter is intended for converting numbers having sixteen bits, the converter will include four tiers of gates and will perform the conversion in four stage delays. The number of stage delays is equal to the number of tiers of gates in the converter. The converter is one in which all the bits of a number to be converted are applied in parallel to the converter. The output bits of the binary-coded number are also available in parallel.

The input connections of the gates 10 through 13 of the first tier result, in effect, in the performance of the exclusive "or" function on respective bits of the input Gray coded word, and corresponding bits of the same word after it is shifted four places to the right with a dropping of the four lowest order bits and the insertion of 0's in the four most significant bit positions. Similarly, the operation of the second tier of gates results in the performance of the exclusive "or" function on bits of the result from the first tier and bits of the result shifted two places to the right. Finally, the gates of the third tier perform the exclusive "or" function on bits of the result from the second tier of gates and the result shifted one place to the right. Therefore, the code conversion process performed by the system of FIG. 1 may also be performed by different means capable of shifting words to the right and performing the exclusive "or" function on respective bits of the unshifted word and the shifted word.

What is claimed is:

1. A converter for converting a number from the Gray code to the binary code, the number having not more than N digits, where N is any integral power of 2, comprising

- not more than N signal paths between Gray code input terminals and respective binary code output terminals, said paths including exclusive "or" gates arranged in $\log_2 N$ tiers,
- each of said tiers including a number equal to $N-N/2^t$ of exclusive "or" gates having inputs coupled to respective low-order signal paths, where $t$ is the number of the particular tier,
- each gate also having an input coupled to a respective signal path $N/2^t$ bit positions removed in the higher order direction.

2. A converter for converting a number from the Gray code to the binary code, comprising

- N signal paths between Gray code input terminals and respective binary code output terminals, N being an integral power of 2, said paths including exclusive "or" gates arranged in $\log_2 N$ tiers,
- each of said tiers including a number equal to $N-N/2^t$ of exclusive "or" gates having inputs coupled to respective low-order signal paths, where $t$ is the number of the particular tier,
- each gate also having an input coupled to a respective signal path $N/2^t$ bit positions removed in the higher order direction.

3. A converter for converting a number from the Gray code to the binary code, the number having not more than N digits, and having more than $N-1$ digits, where N is any integral power of 2, comprising

- N input terminals for digits of the Gray coded number,
- N output terminals for digits of the corresponding binary coded number,
- N signal paths between said input terminals and respective output terminals including exclusive "or" gates arranged in a number equal to $\log_2 N$ of successive tiers,
- each of said tiers including a number equal to $N-N/2^t$ of exclusive "or" gates having inputs coupled to respective low-order signal paths, where $t$ is the number of the particular tier,
- each gate also having an input coupled to a respective signal path $N/2^t$ bit positions removed in the higher order direction.

4. A converter for converting a number from the Gray code to the binary code, comprising

- N input terminals for digits of the Gray coded number, N being an integral power of 2,
- N output terminals for digits of the corresponding binary coded number, N signal paths between said input terminals and respective output terminals including exclusive "or" gates arranged in a number equal to $\log_2 N$ of successive tiers, each of said tiers including a number equal to $N-N/2^t$ of exclusive "or" gates having inputs coupled to respective low-order signal paths, where $t$ is the number of the particular tier, each gate also having an input coupled to a respective signal path $N/2^t$ bit positions removed in the higher order direction.

References Cited

UNITED STATES PATENTS

| | | | |
|---|---|---|---|
| 2,995,666 | 8/1961 | Wood | 307—88.5 |
| 3,108,203 | 10/1963 | Crowell | 235—155 |
| 2,982,953 | 5/1961 | Cadden et al. | 340—347 |
| 2,876,444 | 8/1956 | Moss | 340—347 |

MAYNARD R. WILBUR, *Primary Examiner.*

H. L. BRYAN, W. J. KOPACZ, *Assistant Examiners.*